(12) United States Patent
Boutaghou et al.

(10) Patent No.: US 6,462,909 B1
(45) Date of Patent: Oct. 8, 2002

(54) DISC HEAD SLIDER HAVING WEAR-RESISTANT PADS FOR ENHANCED DAMPING

(75) Inventors: Zine-Eddine Boutaghou, Vadnais Heights; Anthony P. Sannino, Shakopee; Jorge V. Hanchi, Minneapolis, all of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 32 days.

(21) Appl. No.: 09/649,754

(22) Filed: Aug. 28, 2000

Related U.S. Application Data
(60) Provisional application No. 60/203,069, filed on May 9, 2000.

(51) Int. Cl.[7] .................................................. G11B 5/60
(52) U.S. Cl. ............................... 360/235.8; 360/235.6; 360/235.7; 360/236; 360/236.1
(58) Field of Search ........................... 360/235.8, 236.6, 360/235.4, 235.5, 235.7, 236.5

(56) References Cited

U.S. PATENT DOCUMENTS

| | | | |
|---|---|---|---|
| 4,212,044 A | 7/1980 | Plotto | 360/103 |
| 4,218,715 A | 8/1980 | Garnier | 360/103 |
| 4,553,184 A | 11/1985 | Ogishima | 360/103 |
| 4,646,180 A | 2/1987 | Ohtsubo | 360/103 |
| 4,757,402 A | 7/1988 | Mo | 360/103 |
| 4,984,114 A | 1/1991 | Takeuchi et al. | 360/103 |
| 5,086,360 A | 2/1992 | Smith et al. | 360/103 |
| 5,128,822 A | 7/1992 | Chapin et al. | 360/103 |
| 5,200,868 A | 4/1993 | Chapin et al. | 360/103 |
| 5,218,494 A | 6/1993 | Chapin et al. | 360/103 |
| 5,317,465 A | 5/1994 | Chapin et al. | 360/103 |
| 5,343,343 A | 8/1994 | Chapin | 360/103 |
| 5,359,480 A | 10/1994 | Nepela et al. | 360/103 |
| 5,490,026 A | 2/1996 | Dorius et al. | 360/103 |
| 5,513,056 A | 4/1996 | Kawasaki et al. | 360/103 |
| 5,550,693 A | 8/1996 | Hendriks et al. | 360/103 |
| 5,636,085 A | 6/1997 | Jones et al. | 360/103 |
| 5,737,151 A | 4/1998 | Bolasna et al. | 360/103 |
| 5,761,004 A | 6/1998 | Peck | 360/103 |
| 5,796,551 A | 8/1998 | Samuelson | 360/103 |
| 5,953,181 A | 9/1999 | Utsunomiya | 360/103 |
| 5,963,396 A | 10/1999 | Burga et al. | 360/103 |
| 5,973,881 A | 10/1999 | Ajiki | 360/103 |
| 6,137,656 A | * 10/2000 | Levi et al. | 360/235.4 |
| 6,144,528 A | * 11/2000 | Anaya-Dufresne et al. | 360/235.4 |
| 6,188,547 B1 | * 2/2001 | Gui et al. | 360/236.5 |

FOREIGN PATENT DOCUMENTS

| | | |
|---|---|---|
| JP | 60-242548 | 2/1985 |
| JP | 1-211383 | 8/1989 |
| JP | 1-245480 | 9/1989 |
| JP | 1-319188 | 12/1989 |
| JP | 3-132981 | 6/1991 |

\* cited by examiner

Primary Examiner—Robert S. Tupper
(74) Attorney, Agent, or Firm—Westman, Champlin & Kelly

(57) ABSTRACT

A disc head slider for supporting a transducer relative to a data storage disc includes a slider body having a disc-facing surface with a leading slider edge and a trailing slider edge. First and second rails are disposed on the disc-facing surface about a central recess and form first and second bearing surfaces, respectively, which terminate prior to the trailing slider edge. First and second wear-resistant pads are formed on the disc-facing surface between respective ones of the first and second bearing surfaces and the trailing slider edge. The first and second wear-resistant pads are raised from the central recess and are recessed from the first and second bearing surfaces to provide transitions in the disc-facing surface that generate vibration-dampening pressure gradients while limiting contact between the pads and the data storage disc during operation.

18 Claims, 4 Drawing Sheets

DISC HEAD SLIDER HAVING WEAR-RESISTANT PADS FOR ENHANCED DAMPING

CROSS-REFERENCE TO RELATED APPLICATION

This application claims the benefit of U.S. Provisional Application No. 60/203,069, entitled "DIAMOND-LIKE CARBON PAD AAB FOR ENHANCED DAMPING APPLICATION," filed May 9, 2000.

Cross reference is also made to U.S. Ser. No. 09/398,993, entitled "CONVERGENT CHANNEL, TRENCHED DISC HEAD SLIDER," filed Sep. 17, 1999, and to U.S. Ser. No. 09/548,148, entitled "DISC HEAD SLIDER HAVING RECESSED, TRENCHED RAILS FOR ENHANCED DAMPING," filed on Apr. 13, 2000.

BACKGROUND OF THE INVENTION

The present invention relates to disc drive data storage systems and, more particularly, to a disc drive data storage system having a slider, which dampens various modes of excitation of slider vibration.

Disc drives of the "Winchester" and optical types are well known in the industry. Such drives use rigid discs, which are coated with a magnetizable medium for storage of digital information in a plurality of circular, concentric data tracks. The discs are mounted on a spindle motor, which causes the discs to spin and the surfaces of the discs to pass under respective hydrodynamic (e.g. air) bearing disc head sliders. The sliders carry transducers, which write information to and read information from the disc surfaces.

An actuator mechanism moves the sliders from track-to-track across the surfaces of the discs under control of electronic circuitry. The actuator mechanism includes a track accessing arm and a suspension for each head gimbal assembly. The suspension includes a load beam and a gimbal. The load beam provides a load force which forces the slider toward the disc surface. The gimbal is positioned between the slider and the load beam, or is integrated in the load beam, to provide a resilient connection that allows the slider to pitch and roll while following the topography of the disc.

The slider includes a bearing surface, which faces the disc surface. As the disc rotates, the disc drags air under the slider and along the bearing surface in a direction approximately parallel to the tangential velocity of the disc. As the air passes beneath the bearing surface, air compression along the air flow path causes the air pressure between the disc and the bearing surface to increase, which creates a hydrodynamic lifting force that counteracts the load force and causes the slider to lift and fly above or in close proximity to the disc surface.

The bearing clearance between the slider and the disc surface at the recording head is an important parameter to disc drive performance. Slider bearings in computer hard drives have three degrees of freedom, including vertical motion, pitch rotation and roll rotation. The three degrees of freedom are associated with three vibration modes. As in any mechanical system, these three vibration modes have respective natural, or "resonant", frequencies, which depend on the mass and stiffness of the respective degree of freedom. When a slider is subjected to an external vibration source having a frequency that resides in the vicinity of one or more of the bearing's natural frequencies, the slider sustains vibrations, which often result in significant modulation of the head-media spacing. Modulation of the head-media spacing degrades the head's read and write performance and can cause intermittent contact between the head and the disc surface.

As bearing clearances continue to decrease to achieve greater recording densities, micro-waviness in the disc surface has been observed to be an increasing source of vibration excitation for sliders, especially at flying heights below 0.5 microinches. Since micro-waviness is a broad-band frequency type of excitation, it is often impossible to de-couple the bearing's natural frequency with the frequency of the excitation source by changes to the geometry of the bearing surface.

A slider is desired, which dampens head-media separation modulation in response to dynamic excitation induced by media micro-waviness at flying heights below 0.5 microinches.

SUMMARY OF THE INVENTION

One aspect of the present invention relates to disc head slider for supporting a transducer relative to a data storage disc. The slider includes a slider body having a disc-facing surface with a leading slider edge and a trailing slider edge. First and second rails are disposed on the disc-facing surface about a central recess and form first and second bearing surfaces, respectively, which terminate prior to the trailing slider edge. First and second wear-resistant pads are formed on the disc-facing surface between respective ones of the first and second bearing surfaces and the trailing slider edge. The first and second wear-resistant pads are raised from the central recess and are recessed from the first and second bearing surfaces to provide transitions in the disc-facing surface that generate vibration-dampening pressure gradients while limiting contact between the pads and the data storage disc during operation.

Another aspect of the present invention relates to a disc head slider, which includes a slider body having a disc-facing surface with a leading slider edge and a trailing slider edge. A bearing and a wear-resistant pad are formed on the disc-facing surface. The wear-resistant pad includes a convergent channel, which has a leading channel end open to fluid flow from the leading slider edge toward the trailing slider edge, non-divergent channel side walls, and a trailing channel end closed to the fluid flow.

Another aspect of the present invention relates to a disc drive assembly, which includes a disc and a slider bearing. The disc is rotatable about a central axis and has a recording surface with a circumferential waviness characteristic. The slider bearing has a wear-resistant pad for reducing wear on the slider bearing and the disc during rotation of the disc and for generating vibration dampening pressure gradients between the bearing surface and the disc.

DETAILED DESCRIPTION OF ILLUSTRATIVE EMBODIMENTS

Figure 1:
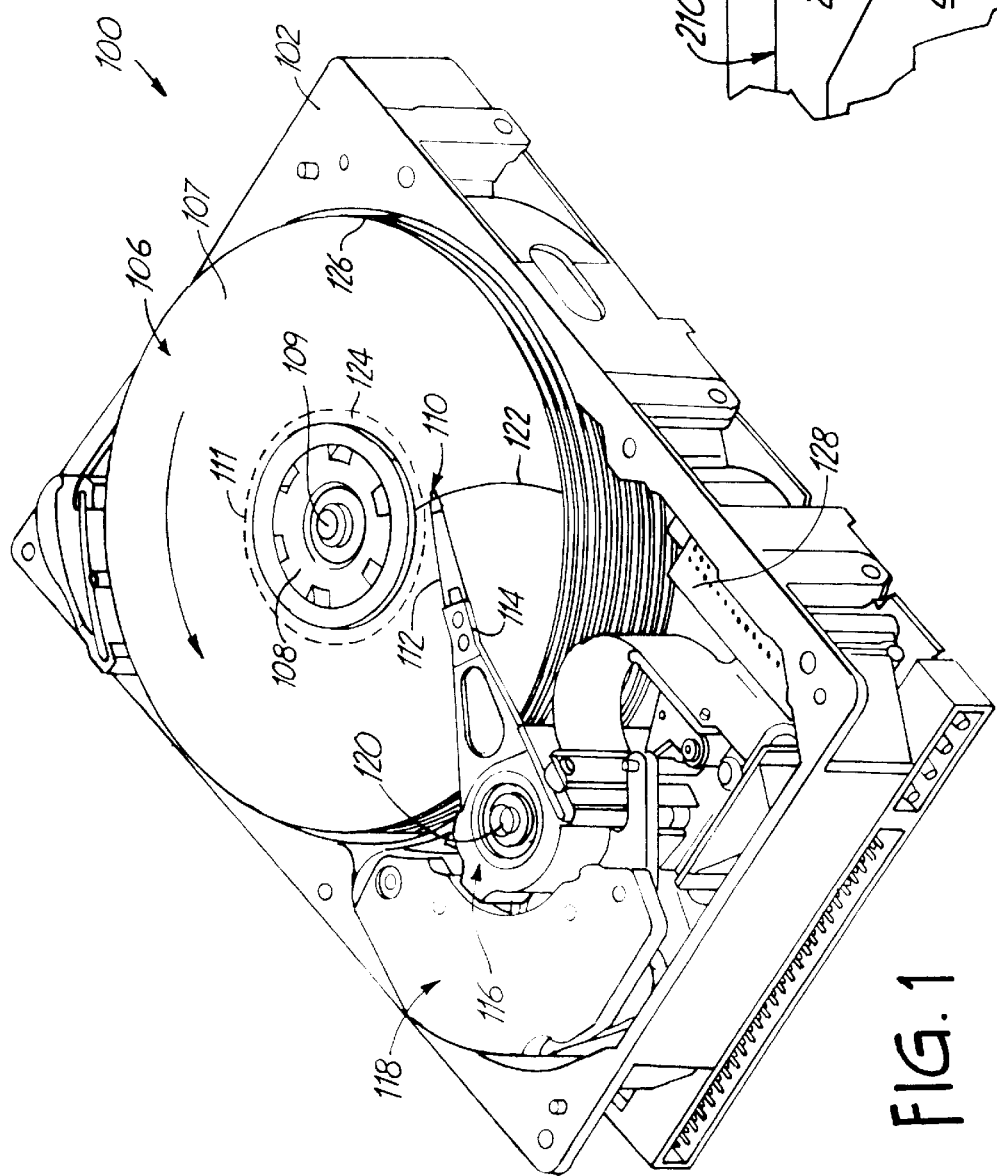
FIG. 1 is a perspective view of a disc drive in which the present invention is useful.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110 which is mounted to disc drive 100 and carries a read/write head for communication with the disc surface. The read/write head can include any type of transducing head, such as an inductive head, a magneto-resistive head, an optical head or a magneto-optical head for example.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of internal circuitry 128. Other types of actuators can also be used, such as linear actuators.

During operation, as discs 107 rotate, the discs drag air under the respective sliders 110 and along their bearing surfaces in a direction approximately parallel to the tangential velocity of the discs. As the air passes beneath the bearing surfaces, air compression along the air flow path causes the air pressure between the discs and the bearing surfaces to increase, which creates a hydrodynamic lifting force that counteracts the load force provided by suspensions 112 and causes the sliders 110 to lift and fly above or in close proximity to the disc surfaces.

Figure 2:
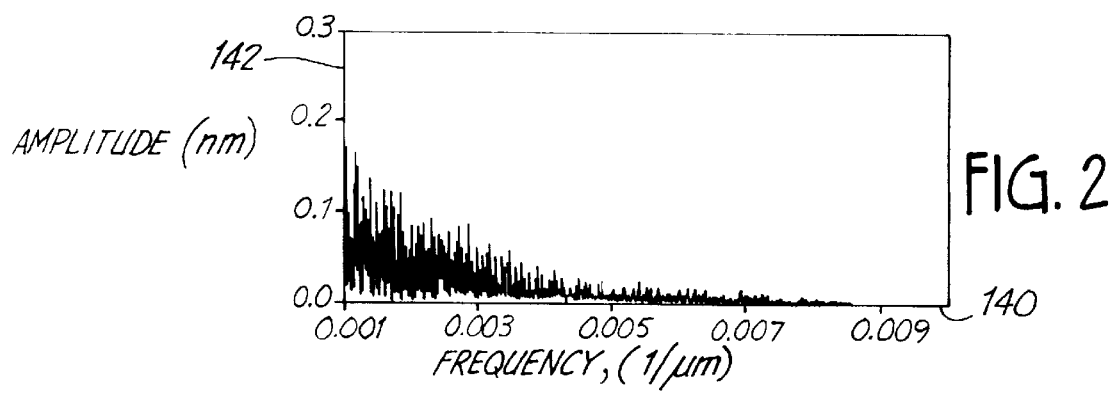
FIG. 2 is a graph showing a typical amplitude spectrum in the spatial frequency domain of media micro-waviness in a rigid magnetic disc surface.
Figure 3:
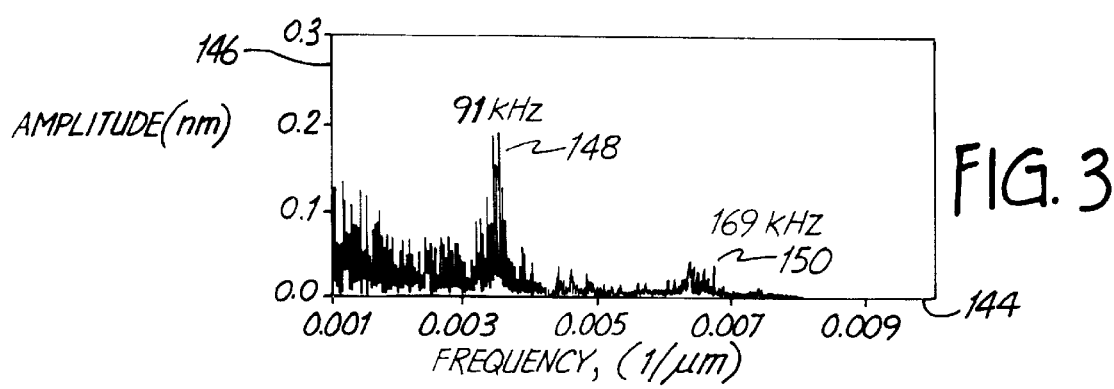
FIG. 3 is a graph showing head vibration response in the spatial frequency domain for a typical 30-series NPAB slider.

Although each of the discs 107 in drive 100 are fabricated as flat as possible, the discs 107 have some amount of circumferential micro-waviness. FIG. 2 is a graph showing a typical amplitude spectrum in the spatial frequency domain of media micro-waviness in a rigid magnetic disc surface. Axis 140 represents spatial frequency (1/wavelength), and axis 142 represents amplitude in nanometers (nm). Experiments were performed on a model of a conventional 30-series negative pressure air bearing slider to obtain measurements of vibrations induced in the slider in response to the disc micro-waviness shown in FIG. 2. FIG. 3 is a graph showing the measured head vibration response in the spatial frequency domain. Axis 144 represents spatial frequency (1/um), and axis 146 represents amplitude (nm) of the vibration induced in the slider. As can be seen in FIG. 3, the conventional slider has two visible resonance frequencies at 91 kHz and 169 kHz, at peaks 148 and 150. The disc micro-waviness therefore excites the natural vibration frequencies of the conventional 30-series slider.

Figure 4:
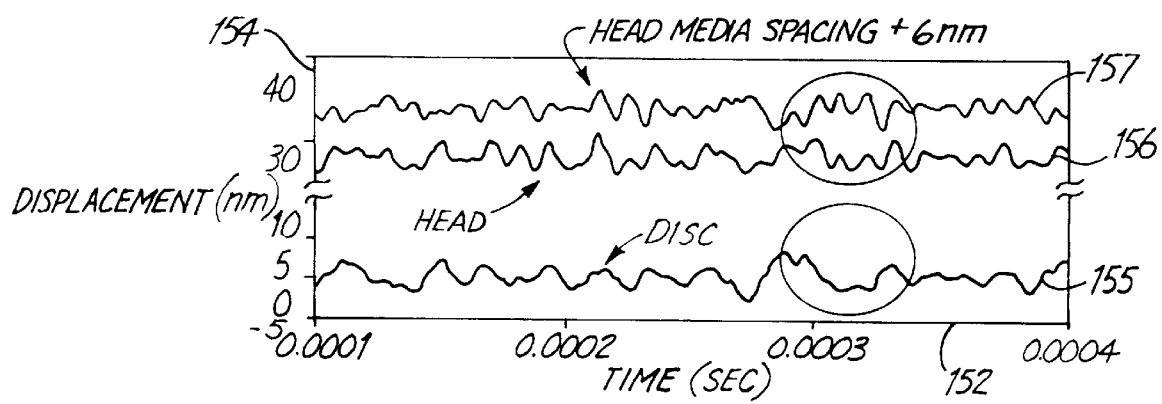
FIG. 4 is a graph illustrating measured head and disc displacement over time with the disc micro-waviness shown in FIG. 2 and the head vibration response shown in FIG. 3.

FIG. 4 is a graph illustrating measured head and disc displacement over time for the conventional 30-series slider given the disc micro-waviness shown in FIG. 2 and the head vibration response shown in FIG. 3. Axis 152 represents time in seconds, and axis 154 represents displacement in nm. Line 155 represents the vertical displacement of the disc surface over time. Line 156 represents the vertical displacement of the conventional 30-series slider at the head location induced by the disc micro-waviness over time. Since displacement of the head and disc are out of phase with one another, this results in modulation of the head-media separation (plus 6 nm), as shown by line 157. In this particular case, a modulation of 6 nm was observed for a nominal flying height of 30 nm, which corresponds to a 20% modulation in flying height.

Further experimental data showed that such fluctuation in flying height can be detrimental to mechanical and magnetic performance of the head-disc interface at lower flying heights, and particularly at flying heights below 12 nm or 0.5 uin. Specifically, this flying height fluctuation can cause intermittent contact between the head and disc surface and can cause degradation of the head's read/write performance.

As discussed in more detail below, each slider 110 (shown in FIG. 1) has a hydrodynamic (e.g., air) bearing that provides decreased head-media separation (HMS) modulation in response to dynamic excitation induced by media micro-waviness, other media defects or patterned media, at flying heights at or below 0.5 microinches and provides a protection feature during intermittent contact.

Figure 5:
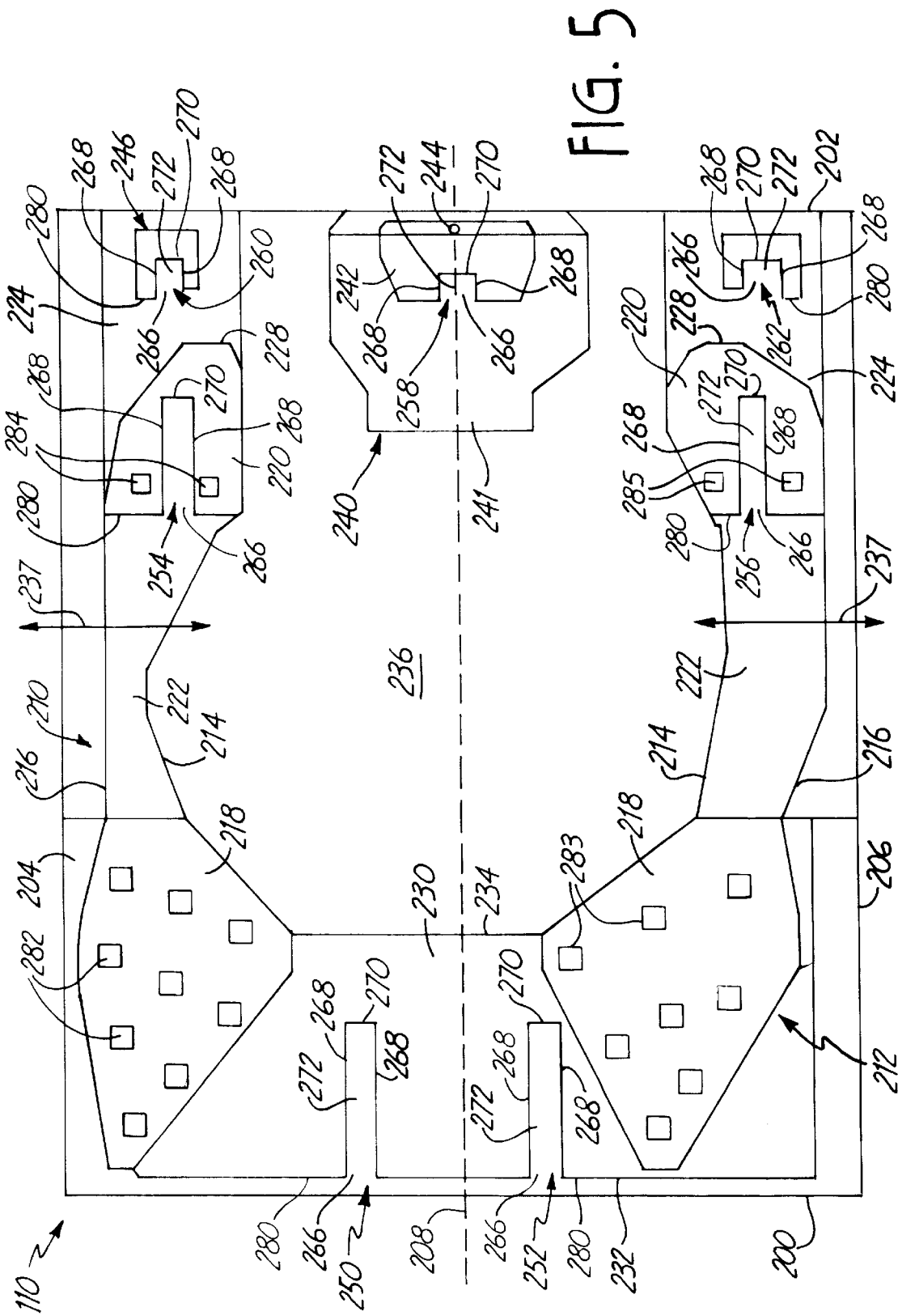
FIG. 5 is a bottom plan view of a slider shown in FIG. 1, as viewed from the surface of a disc, according to one embodiment of the present invention.

FIG. 5 is a bottom plan view of one of the sliders 110 of FIG. 1, as viewed from the surface of disc 107. Slider 110 has a leading edge 200, a trailing edge 202, side edges 204 and 206, and a lateral center line 208. Elongated, raised side rails 210 and 212 are positioned along side edges 204 and 206, respectively. Rails 210 and 212 extend generally from leading slider edge 200 toward trailing slider edge 202. Each rail 210 and 212 has an inside rail edge 214, an outside rail edge 216, a leading bearing surface 218, a trailing bearing surface 220, a recessed waist surface 222 and a recessed trailing surface 224. Recessed waist surface 222 extends from leading bearing surface 218 to trailing bearing surface 220. Recessed trailing surface 224 extends from trailing bearing surface 220 to trailing slider edge 202, or can alternatively terminate prior to trailing slider edge 202. In one embodiment, recessed waist surfaces 222 and recessed trailing surfaces 224 are generally parallel to and recessed from bearing surfaces 218 and 220 by a step depth of 0.1 to 0.3 um. Other depths can also be used in alternative embodiments. These surfaces reduce the contact area of slider 110 when at rest on the surface of disc 107 and develop substantially ambient pressure during flight. The recessed trailing surfaces 224 also reduce the chances of contact with the surface of disc 107 when slider 110 flies with a positive pitch and/or roll angles. In addition, recessed surfaces 222 and 224 also provide pressurization for convergent channel features formed on slider 110, as described in more detail below.

A cavity dam 230 extends between rails 210 and 212, along leading slider edge 200. Cavity dam 230 has a leading edge 232 and a trailing edge 234. Cavity dam 230 and inside edges 214 of side rails 210 and 212 define a central recess or subambient pressure cavity 236, which trails cavity dam 230 relative to a direction of air flow from the leading slider edge 200 toward trailing slider edge 202. In one embodiment, the floor of subambient pressure cavity 236 is recessed from leading and trailing bearing surfaces 218 and 220 by 1 to 3 um. Although recessed waist surfaces 222 are recessed from bearing surfaces 218 and 220, waist surfaces 222 remain raised from the floor of cavity 236 such that the waist surfaces 222 continue to define the shape of the cavity 236 and contain subambient pressure within cavity 236. Recessed waist surfaces 222 provide a lateral channel between subambient pressure cavity 236 and ambient pressure at slider side edges 204 and 206, thereby allowing transverse viscous shear flow, represented by arrows 237. This transverse viscous shear flow along arrows 237 provides an energy dissipation mechanism, which dampens vibrations in slider 110 that are induced by disc media micro-waviness. This, in turn, reduces modulation of the head-media separation.

In one embodiment, cavity dam 230 is generally parallel to and recessed from bearing surfaces 218 and 220 by a step depth of 0.1 to 0.3 um, for example. Other depths can also be used. In addition, cavity dam 230 can be formed with a tapered leading edge in alternative embodiments, if desired.

A raised center pad or rail 240 is positioned along trailing slider edge 202 and is centered along lateral center line 208. In alternative embodiments, center pad 240 can be skewed or offset with respect to line 208. Center pad 240 has a leading step surface 241 and a bearing surface 242. Leading step surface 241 is generally parallel to and recessed from bearing surface 242 by a step depth of 0.1 to 0.3 um, for example, for providing pressurization of bearing surface 242 from air flow venting from cavity 236. Center rail 240 supports a read/write transducer 244 along trailing slider edge 202. In alternative embodiments, transducer 244 can be positioned at other locations on slider 110. However, when placed at or near trailing slider edge 202, transducer 244 is located at the closest point on slider 110 to the surface of disc 107 (shown in FIG. 1) when slider 110 flies with a positive pitch angle. With a positive pitch angle, trailing slider edge 202 is closer to the surface of disc 107 than leading slider edge 200.

As mentioned above, recessed trailing surfaces 224 allow slider 110 to roll about lateral center line 208. Therefore, trailing edge of center pad 240 remains the closest location on slider 110 to the disc surface during flight at relatively large roll angles, thereby improving read and write performance. However, truncating trailing bearing surfaces 220 prior to trailing slider edge 202 reduces the amount of positive pressure developed along the rails near trailing slider edge 202, which reduces pitch and roll stiffness.

In order to limit the reduction in pitch and roll stiffness and to further limit head-media separation modulation, slider 110 includes convergent channel features 250, 252, 254, 256, 258, 260 and 262. Leading convergent channel features 250 and 252 are recessed within cavity dam 230. Trailing convergent channel features 254 and 256 are recessed within trailing bearing surfaces 220 of rails 210 and 212. Trailing convergent channel feature 258 is recessed within center rail bearing surface 242. Channels 260 and 262 are recessed within wear-resistant pads 246 and 248, which are formed on recessed trailing surfaces 224 of rails 210 and 212. These channel features can also be referred to as trenches.

In one embodiment, wear-resistant pads 246 and 248 are fabricated on recessed trailing surfaces 224 and have a disc-facing surface formed of a material that has a greater resistance to wear during contact with the surface of disc 107 than the substrate material of slider 110 under normal operating velocity and loading conditions. This material can include a diamond-like carbon (DLC) material or any other wear-resistant material that is suitable for use in a disc drive. Wear-resistant pads 246 and 248 form a more compliant interface than the slider substrate material, which serves to reduce or prevent formation of debris, physical damage to slider 110, damage to the media surface and damage to data stored within the media in case of intermittent contact with the disc surface. Pads 246 and 248 can be formed entirely of a DLC or similar material or can be formed by etching or milling the substrate and then applying a DLC layer to the pad surface. Other fabrication methods can also be used.

In one embodiment, pads 246 and 248 have heights of 0.05 um to 0.15 um, for example, as measured from recessed trailing surfaces 224. Pads 246 and 248 are therefore recessed from trailing bearing surfaces 220 by about 0.05 um to 0.25 um, for example, to prevent contact between the pads and the disc surface during normal operation when slider 110 flies with a positive pitch angle.

Channels 250, 252, 254, 256, 258, 260 and 262 each have a leading channel end 266, non-divergent side walls 268, a trailing channel end 270 and a channel floor (or "step surface") 272. These channels also have a side wall 280 to either side of the leading channel ends 266. Channels 250, 252, 254, 256 and 258 are formed through photolithography processes such as ion milling, chemical etching or reactive ion etching (RIE). With these processes, the depth and location of the channels can be accurately controlled. Channels 260 and 262 are formed through patterning techniques used during the fabrication process of wear-resistant pads 246 and 248.

In one embodiment, channel floors 272 of trailing channels 254 and 256 are coplanar and contiguous with recessed waist surfaces 222 of rails 210 and 212. Channel floor 272 of channel 258 is coplanar and contiguous with leading step surface 241 of center rail 240. Channel floors 272 of channels 260 and 262 of pads 246 and 248 are coplanar and contiguous with recessed trailing surfaces 224 of rails 210 and 212.

In one embodiment, leading channels 250 and 252 are milled or etched during the formation of both the step surfaces 222, 224, 230 and 241 and the cavity 236 such that leading channels 250 and 252 have a depth of 1.1 to 3.3 micrometers, as measured from bearing surfaces 218 and 220.

During operation, the leading walls to either side of each channel present themselves as a substantial pressure rise to the local fluid flow. Since the opening to each channel, at leading channel ends 266, does not have the same pressure rise, it is seen as a preferential path for the fluid flow to travel. Once the fluid flow enters channels 250, 252, 254, 256, 258, 260 and 262, the flow is essentially bounded by channel side walls 268 and trailing channel end 270 and is forced to rise over trailing channel end 270, forming a "convergent" channel for the flow. This creates the localized pressure areas at discrete regions on the slider surface. In one embodiment, these discrete regions have surface areas, rearward of trailing channel ends 270 that are at least as long as the width of the channels, as measured between side walls 268. This provides sufficient surface area on which the localized pressure gradients can act. These channels can be symmetrical about lateral center line 208, as shown in FIG. 2, or can be asymmetrical to provide preferential pressurization at certain slider skew angles.

In leading channels 250 and 252, leading channel end 266 is open to fluid flow from slider leading edge 200. However, trailing channel end 270 is closed to the fluid flow. A portion of the fluid flow from slider leading edge 200 is directed into channels 250 and 252 and is forced to exit the channels over trailing channels ends 270. This creates localized positive pressure gradient regions on cavity dam 230 rearward of trailing channel ends 270. The localized positive pressure gradients yield high peak pressures, which increase the pitch stiffness of slider 110. The high pressure gradients also provide an energy dissipation mechanism during slider vibration, which dampens leading edge pitch mode type vibrations at the slider's natural resonance frequencies.

Similarly, in trailing channels 254 and 256, leading channel end 266 is open to fluid flow from recessed waist surfaces 222 of the side rails 210 and 212, respectively. A portion of the fluid flow from recessed surfaces 222 is directed into channels 254 and 256 and is forced to exit the channels over trailing channels ends 270. This creates localized positive pressure gradient regions on trailing bearing surfaces 220, rearward of trailing channel ends 270. The localized positive pressure developed on trailing bearing surfaces 220 increases the roll stiffness of slider 110 and yields high peak pressures and pressure gradients, which dampens roll mode type vibrations at the slider's natural resonance frequencies.

With respect to channel 258 on center rail 240, the leading end 266 of this channel is open to fluid flow from cavity 236. A portion of the fluid flow from cavity 236 is directed into channel 258 and is forced to exit the channel over trailing channel end 270. Again, this creates a localized positive pressure gradient region on bearing surface 242, rearward of trailing channel end 270. The localized positive pressure developed on center rail bearing surface 242 increases the pitch stiffness of slider 110 and dampens trailing edge pitch mode type vibrations at the slider's natural resonance frequencies.

The leading channel ends 266 of channels 260 and 262 formed in pads 246 and 248 are open to fluid flow from recessed trailing surfaces 224 of the side rails 210 and 212, respectively. A portion of the fluid flow from recessed trailing surfaces 224 is directed into channels 260 and 262 and is forced to exit the channels over trailing channels ends 270. This creates localized positive pressure gradient regions on the surfaces of pads 246 and 248, rearward of trailing channel ends 270. The localized positive pressure developed on pads 246 and 248 increases the roll stiffness of slider 110 and yields high peak pressures and pressure gradients, which dampen roll mode type vibrations and trailing edge pitch mode type vibrations.

The size and intensity of the localized positive pressure gradient regions depend on the channel length to width ratio, the absolute sizes of the channels, the depth and shape of the channel floors, and the height of the column of air between the channel floor and the disc surface. In one embodiment, the ratio of the channel lengths to the channel widths range from 0.5 to 5.0, but may vary outside that range depending the design purposes of the channel feature. In another embodiment, the length to width ratio ranges from 2.0 to 2.5. Since slider 110 flies with a positive pitch, the column of air beneath leading channels 250 and 252 is longer than the column of air beneath channels 254, 256, 258, 260 and 262. Therefore, leading channels 250 and 252 are formed deeper than trailing channels 254, 256 and 258, as described above, to achieve sufficient pressure gradients along leading bearing surfaces 218.

Slider 110 can further include additional raised wear-resistant pads or "bumps" 282–285, which extend slightly from bearing surfaces 218 and 220 by about 0.05 um to about 0.15 um, for example. Pads 282–285 can be formed of DLC or another wear-resistant material, which is deposited or otherwise fabricated on slider 110, similar to pads 246 and 248. Pads 282–285 have several functions. First, the pads provide a slight separation between bearing surfaces 218 and 220 and the disc surface when slider 110 is at rest for reducing stiction forces between the slider and the disc surface. The pads also provide additional pressure gradients, which serve to dampen leading edge pitch mode type vibrations at the slider's natural resonance frequencies. In alternative embodiments, one or more of the pads 282–285 can also be notched to form one or more additional convergent channel features on slider 110. Pads 282–285 can have a variety of cross-sectional shapes, such as circular, rectangular or elongated ovals and can have various positions on the surface of slider 110.

Figure 6:
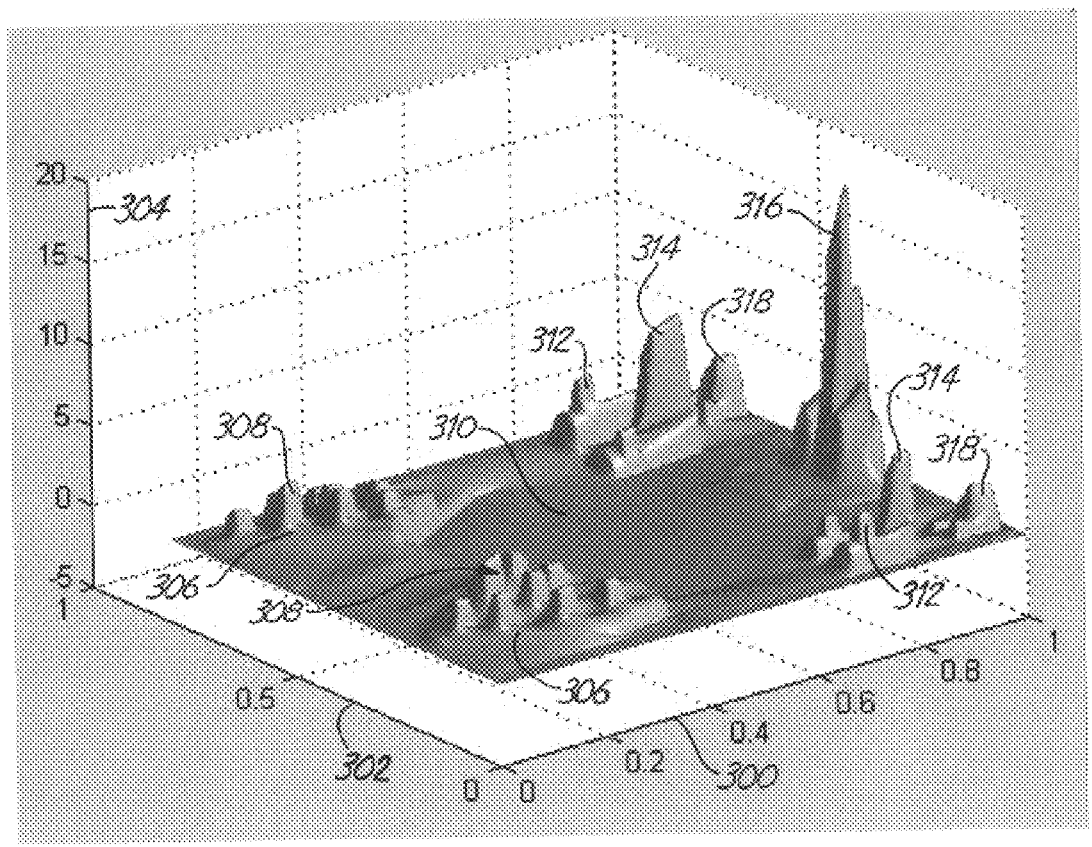
FIG. 6 is a three dimensional diagram illustrating a pressure profile across the bearing surfaces of the slider shown in FIG. 5.

FIG. 6 is a three dimensional diagram illustrating a pressure profile across the bearing surfaces of slider 110 according to one embodiment of the present invention. Axis 300 represents position along side edge 206, as measured from leading edge 200 to trailing edge 202. Axis 302 represents distance along leading slider edge 200. Axis 304 represents pressure amplitude in giga-pascals/meter. The pressure profile in FIG. 6 does not show the peak pressures generated by leading channels 250 and 252 since the profile shows slider 110 in a steady state, with the leading edge relatively far away from the disc surface as compared to the trailing edge. However, with leading edge pitch mode vibrations, the clearance at the slider's leading edge can modulate. When this clearance reduces, high pressure gradients are created by leading channels 250 and 252, which dampen the vibrations. Leading bearing surfaces 218 generate moderate positive pressure 306 just aft of slider leading edge 200. Pads 282 and 283, which are deposited on leading bearing surfaces 218, generate high pressure gradients 308. Subambient pressure cavity 236 generates subambient pressure in area 310. Trailing bearing surfaces 220 of side rails 210 and 212 generate moderate positive pressure in area 312 due to the recess of waist surfaces 222. However, channels 254 and 256 generate high localized pressure peaks 314, which compensate for the pressure loss over waist surfaces 222 and provides high roll stiffness and vibration damping. Likewise, channel 258 in center rail 240 generates a high localized pressure peak 316 near trailing slider edge 202, which provides high pitch stiffness and vibration damping. Finally, channels 260 and 262 formed in pads 246 and 248 generate high localized pressure peaks 318 near trailing slider edge 202, which provides high pitch and roll stiffness and vibration damping. It has been found that notched pads 246 and 248 increase the damping ratio for trailing edge pitch and roll mode vibrations by about 1–3 percent over a slider having a similar geometry without notched pads 246 and 246.

The convergent channel features provided on slider 110 therefore allow enhanced damping and minimization of air bearing vibration provoked by excitation sources, such as media micro-waviness, wear debris on the media, shock waves and intermittent contact with the media. Vibration damping capability is increasingly critical for head-media separation modulation control for sliders having flying heights at or below 0.5 uin and for sliders having intermittent contact with the disc surface, such as sliders having with ultra-low flying heights or quasi-contact conditions. Greater control of head-media separation modulation therefore preserves mechanical and magnetic read/write quality of the head-disc interface.

Figure 7:
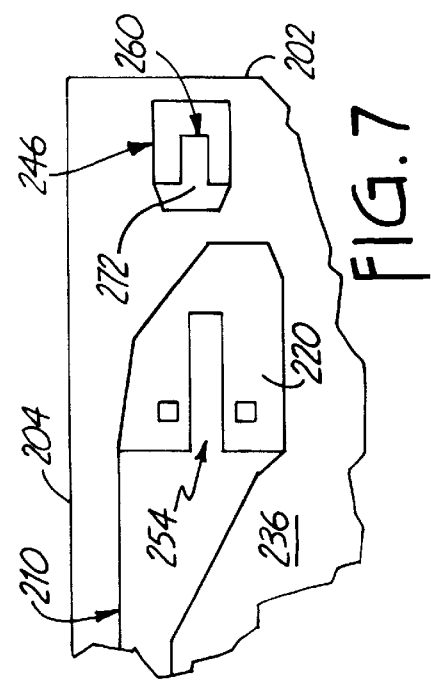
FIG. 7 is a fragmentary view of the slider shown in FIG. 1, which illustrates a wear-resistant pad that is formed as a discrete element from one of the side rails on the slider, according to an alternative embodiment of the present invention.

Notched pads 246 and 248 can have several configurations in alternative embodiments. For example, FIG. 7 is a fragmentary view of slider 110 showing pad 246 being formed discrete from rail 210. In this embodiment, rail 210 terminates prior to trailing slider edge 202, with no recessed trailing surface 224 (shown in FIG. 5). Rather, pad 246 is formed on the floor of cavity 236 and formed with a channel floor 272 that is recessed from the top surface of pad 246 by about 0.1 um to 0.3 um, for example. Other configurations are also possible. For example, each wear resistance pad 246 and 248 can be formed without a notch while still providing a height change for generating pressure gradients near trailing edge 202 of slider 110 that dampen vibrations caused by a variety of excitation sources such as micro-waviness of the disc surface. A variety of cross-sectional pad shapes can be used. Additional notched or un-notched, wear-resistant pads can also be placed in other areas on slider 110, such as on the center pad 240, cavity dam 230, bearing surfaces 218 and 220 and recessed waist surfaces 222 in alternative embodiments.

In one alternative embodiment, leading convergent channel features 250 and 252 are recessed within leading bearing surfaces 218(shown in FIG. 5) and extend toward leading slider edge 200. This creates localized pressure gradient regions on leading bearing surfaces 218, as opposed to cavity dam 230. In addition, other air bearing geometries can also be used. For example, center rail 240 (in FIG. 5) can extend all the way to cavity dam 230, with leading step surface 241 having an elongated rectangular section which leads to the trailing edge of cavity dam 230. This elongated center rail can have a leading bearing surface, which is formed on cavity dam 230. Other variations can also be made.

Although the present invention has been described with reference to preferred embodiments, workers skilled in the art will recognize that changes may be made in form and detail without departing from the spirit and scope of the invention. For example, the present invention can be used on sliders having various bearing geometries, such as negative pressure air bearing (NPAB) sliders and positive pressure air bearing (PPAB) sliders.

What is claimed is:

1. A disc head slider for supporting a transducer relative to a data storage disc, the slider comprising:
    a slider body having a disc-facing surface with a leading slider edge and a trailing slider edge;
    first and second rails disposed on the disc facing surface about a central recess and forming first and second bearing surfaces, respectively, wherein the first and second bearing surfaces terminate prior to the trailing slider edge; and
    first and second wear-resistant pads formed on the disc-facing surface between respective ones of the first and second bearing surfaces and the trailing slider edge, wherein the first and second wear-resistant pads are raised from the central recess and recessed from the first and second bearing surfaces to provide transitions in the disc-facing surface that generate vibration-dampening pressure gradients while limiting contact between the pads and the data storage disc during operation, and the first and second wear-resistant pads each have a surface formed of a material that has a greater resistance to wear than the slider body during contact with the data storage disc.

2. The disc head slider of claim 1 wherein the material comprises a diamond-like carbon (DLC) material.

3. The disc head slider of claim 1 wherein the first and second wear-resistant pads are positional generally along the trailing slider edge.

4. The disc head slider of claim 1 wherein each of the first and second wear-resistant pads comprises:
    a convergent channel recessed within the respective wear-resistant pad and having a leading channel end open to fluid flow from the leading slider edge toward the trailing slider edge, non-divergent channel side walls, and a trailing channel end closed to the fluid flow.

5. The disc head slider of claim 4 wherein the convergent channel further comprises a channel floor, which is recessed from an upper surface of the respective wear-resistant pad by about 0.1 um to about 0.3 um.

6. The disc head slider of claim 1 wherein:
    the first and second rails further comprise first and second recessed surfaces, respectively, which are raised from the central recess, are recessed from the first and second bearing surfaces and extend rearward from the first and second bearing surfaces, respectively, toward the trailing slider edge; and
    wherein the first and second wear-resistant pads are formed on the first and second recessed surfaces, respectively.

7. The disc head slider of claim 6 wherein the convergent channels of the first and second wear-resistant pads further comprise a channel floor, which is coplanar and contiguous with the respective first and second recessed surfaces.

8. A disc head slider for supporting a transducer relative to a data storage disc, the slider comprising:
    a slider body having a disc-facing surface with a leading slider edge and a trailing slider edge;
    a bearing formed in the disc-facing surface; and
    a first wear-resistant pad formed on the disc-facing surface and comprising a first convergent channel having a leading channel end open to fluid flow from the leading slider edge toward the trailing slider edge, non-divergent channel side walls, and a trailing channel end closed to the fluid flow, wherein the first wear-resistant pad comprises a surface formed of a material that has a greater resistance to wear than the slider body during contact with the data storage disc.

9. The disc head slider of claim 8 wherein the material comprises a diamond-like carbon (DLC) material.

10. The disc head slider of claim 8 wherein the first wear-resistant pad is positioned generally along the trailing slider edge.

11. The disc head slider of claim 8 wherein the first convergent channel further comprises a channel floor, which is recessed from an upper surface of the first wear-resistant pad by about 0.1 um to about 0.3 um.

12. The disc head slider of claim 8 wherein the first convergent channel comprises:
    a channel width, which is measured between the channel side walls, wherein the trailing channel end is positioned forward of a localized pressure gradient region on an upper surface of the first wear-resistant pad, and the localized region has a length that is at least as long as the channel width.

13. The disc head slider of claim 8 and further comprising:
    a recessed area having a recess floor;
    a second wear-resistant pad deposited on the disc-facing surface and comprising a second convergent channel having a leading channel end open to fluid flow from the leading slider edge toward the trailing slider edge, non-divergent channel side walls, and a trailing channel end closed to the fluid flow; and wherein the first and second wear-resistant pads are disposed from one another about the recessed area.

14. The disc head slider of claim 13 wherein the bearing comprises:

first and second elongated rails disposed about the recessed area, wherein each rail has a bearing surface and a recessed surface, and wherein the recessed surface is raised from the recess floor, is recessed from the bearing surface and extends from the bearing surface toward the trailing slider edge; and wherein the first and second wear-resistant pads are formed on the recessed surfaces of the first and second elongated rails, respectively.

15. The disc head slider of claim 14 wherein the first and second convergent channels each further comprises a channel floor, which is coplanar and contiguous with the recessed surfaces of the first and second elongated rails.

16. The disc head slider of claim 14 wherein the first and second wear-resistant pads are recessed from the bearing surfaces of the first and second elongated rails.

17. The disc head slider of claim 8 wherein the bearing comprises an elongated rail forming a bearing surface and wherein the first wear-resistant pad is formed on the bearing surface.

18. A disc drive assembly comprising:

a disc rotatable about a central axis and having a recording surface with a circumferential waviness characteristic; and a slider bearing having a slider body and wear-resistant pad means on the slider body for reducing wear on the slider bearing and the disc during rotation of the disc and for generating vibration dampening pressure gradients between the bearing surface and the disc, wherein the wear-resistant pad means comprises a surface formed of a material that has a greater resistance to wear than the slider body during contact with the disc.

* * * * *